US012558208B2

(12) United States Patent
Ou et al.

(10) Patent No.: US 12,558,208 B2
(45) Date of Patent: *Feb. 24, 2026

(54) METHOD OF PREPARING A MEDICAMENT DELIVERY TOOTH COVERING

(71) Applicant: 3D GLOBAL BIOTECH INC., New Taipei City (TW)

(72) Inventors: Keng-Liang Ou, New Taipei City (TW); Chao-Hsuan Chen, Taipei City (TW); Chih-Hua Yu, Hualien County (TW); Yu-Hao Chan, Taipei City (TW); Wei-Jen Cheng, New Taipei City (TW)

(73) Assignee: 3D GLOBAL BIOTECH INC., New Taipei City (TW)

( * ) Notice: Subject to any disclaimer, the term of this patent is extended or adjusted under 35 U.S.C. 154(b) by 214 days.

This patent is subject to a terminal disclaimer.

(21) Appl. No.: 17/840,846

(22) Filed: Jun. 15, 2022

(65) Prior Publication Data

US 2022/0401203 A1 Dec. 22, 2022

(30) Foreign Application Priority Data

Jun. 21, 2021 (TW) .................................. 110207109

(51) Int. Cl.
*A61C 19/06* (2006.01)

(52) U.S. Cl.
CPC .................................. *A61C 19/066* (2013.01)

(58) Field of Classification Search
CPC .............................................. A61C 19/06–066
See application file for complete search history.

(56) References Cited

U.S. PATENT DOCUMENTS 3,688,406 A * 9/1972 Porter .................. A61C 19/063
433/80
2002/0081555 A1* 6/2002 Wiesel ................. A61C 19/063
433/80

(Continued)

FOREIGN PATENT DOCUMENTS

CN 112841857 A * 5/2021 ............. A46B 15/00
WO WO-2011016772 A1 * 2/2011 ........... A61K 6/0017

(Continued)

OTHER PUBLICATIONS

Translation of CN 112841857 A (Year: 2021).*
Translation of WO2021189435 (Year: 2021).*

*Primary Examiner* — Thomas C Barrett
*Assistant Examiner* — Matthew P Saunders
(74) *Attorney, Agent, or Firm* — Li & Cai Intellectual Property (USA) Office

(57) ABSTRACT

A medicament delivery tooth covering is provided. The medicament delivery tooth covering includes a tooth covering and a carrier layer. The tooth covering has at least one attachment surface that covers a surface of teeth of a user. The carrier layer is arranged on the at least one attachment surface. The carrier layer carries a medicament, and the medicament contains powder particles. When water is introduced to an inner side of the at least one attachment surface of the tooth covering, the water is allowed to pass through the carrier layer, so that the medicament contacts the water. The powder particles are dual-structured powder particles that have a core structure and an outer layer structure that encloses an outer side of the core structure.

4 Claims, 10 Drawing Sheets

(56) References Cited

U.S. PATENT DOCUMENTS

| | | | | |
|---|---|---|---|---|
| 2002/0182154 A1 * | 12/2002 | McLaughlin | ........ | A61C 19/063 |
| | | | | 424/53 |
| 2004/0005277 A1 * | 1/2004 | Willison | ................ | A61C 19/08 |
| | | | | 424/53 |
| 2007/0077533 A1 * | 4/2007 | McLaughlin | ........ | A61K 8/0208 |
| | | | | 433/80 |
| 2016/0331500 A1 * | 11/2016 | Kolb | ...................... | A61Q 11/00 |

FOREIGN PATENT DOCUMENTS

| WO | WO-2017051401 A1 * | 3/2017 |
|---|---|---|
| WO | WO-2021189435 A1 * | 9/2021 |

* cited by examiner

200

100

METHOD OF PREPARING A MEDICAMENT DELIVERY TOOTH COVERING

CROSS-REFERENCE TO RELATED PATENT APPLICATION

This application claims the benefit of priority to Taiwan Patent Application No. 110207109, filed on Jun. 21, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a tooth covering configured to be worn on teeth of a user, and more particularly to a medicament delivery tooth covering.

BACKGROUND OF THE DISCLOSURE

The structure of a tooth includes an enamel part covering a surface of a dental crown, as well as dentin and dental pulp that contain nerves and blood vessels in an inner layer. Since a main component of the enamel and the dentin is hydroxyapatite (HAp), the enamel and the dentin are both highly-calcified hard tissues.

Toothbrushes, dental floss, mouthwash, etc. are generally used on a daily basis for maintaining oral hygiene. People who pay more attention to dental care often also use whitening agents, tooth remineralizing agents or desensitizing agents to take care of their teeth.

A conventional dental medicament is usually coated onto a strip, dental braces, or a dental tray. Then, the strip, the dental braces or the dental tray is placed on a dentition of a user, so that said medicament can be delivered to the teeth.

However, oftentimes, such mechanisms for delivering the medicament can only maintain its function for a short period of time. The strip, the dental braces or the dental tray needs to be taken down constantly for recoating of the medicament, and then be placed on the dentition again. This manner of use is extremely inconvenient, and cannot provide a long-lasting and uninterrupted dental care effect.

Therefore, how to overcome the above-mentioned deficiencies through improving a conventional tool for delivery of a medicament has become one of the important issues to be solved in the industry.

SUMMARY OF THE DISCLOSURE

In response to the above-referenced technical inadequacies, the present disclosure provides a medicament delivery tooth covering configured to overcome issues associated with a conventional tool for delivery of a dental medicament.

In one aspect, the present disclosure provides a medicament delivery tooth covering, which includes a tooth covering and a carrier layer. The tooth covering has at least one attachment surface that covers a surface of teeth of a user.

The carrier layer is arranged on the at least one attachment surface. The carrier layer carries a medicament, and the medicament contains powder particles. When water is introduced to an inner side of the at least one attachment surface of the tooth covering, the water is allowed to pass through the carrier layer, so that the medicament contacts the water.

In an exemplary embodiment, the carrier layer is a gel layer that is coated on the at least one attachment surface, and the medicament is mixed in the gel layer.

In an exemplary embodiment, the carrier layer is an elastic gel layer, and an inside of the elastic gel layer is impregnated with or coated by the medicament.

In an exemplary embodiment, the carrier layer is a porous sintered material layer that is formed by sintering a particle material, and the medicament is mixed in the particle material.

In an exemplary embodiment, the carrier layer is a porous water-permeable film, and the medicament is contained in a gap between the carrier layer and the at least one attachment surface.

In an exemplary embodiment, the medicament is one selected from a tooth remineralizing agent, a tooth desensitizing agent, and a tooth whitening agent. In an exemplary embodiment, any one of the powder particles has a core structure and an outer layer structure that encloses an outer side of the core structure.

In an exemplary embodiment, the core structure of the powder particles is an amorphous calcium phosphate (ACP) core, and the outer layer structure of the powder particles is a β-tricalcium phosphate (β-TCP) shell.

Therefore, one of the beneficial effects of the present disclosure is that, through the carrier layer being arranged on the attachment surface of the tooth covering and the carrier layer carrying the medicament that provides dental care effects, the medicament delivery tooth covering provided by the present disclosure allows the medicament to be directly delivered to the teeth of the user, so as to bring about the dental care effects of remineralization, whitening, enamel restoration, and desensitization.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
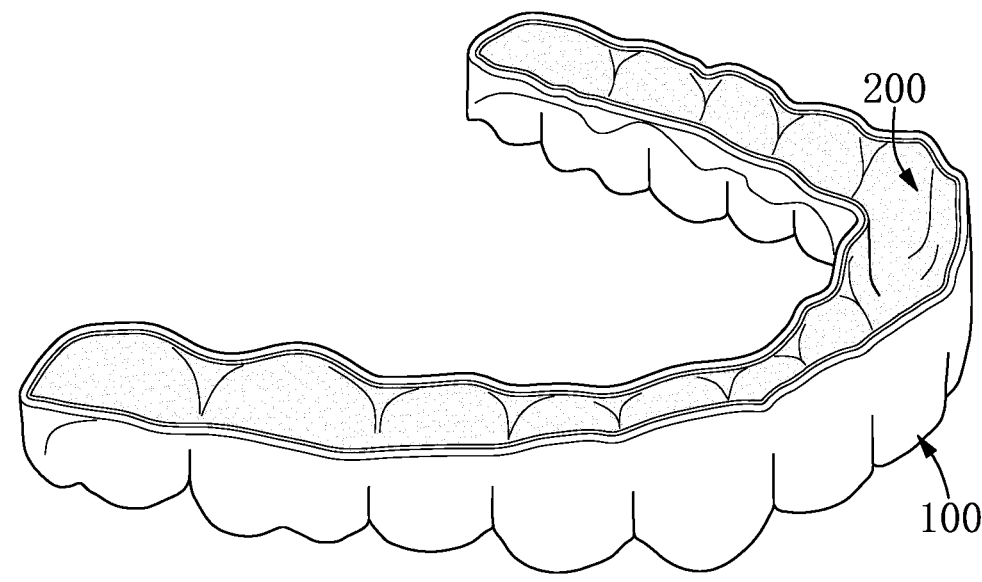
FIG. 1 is a schematic perspective view of a medicament delivery tooth covering according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
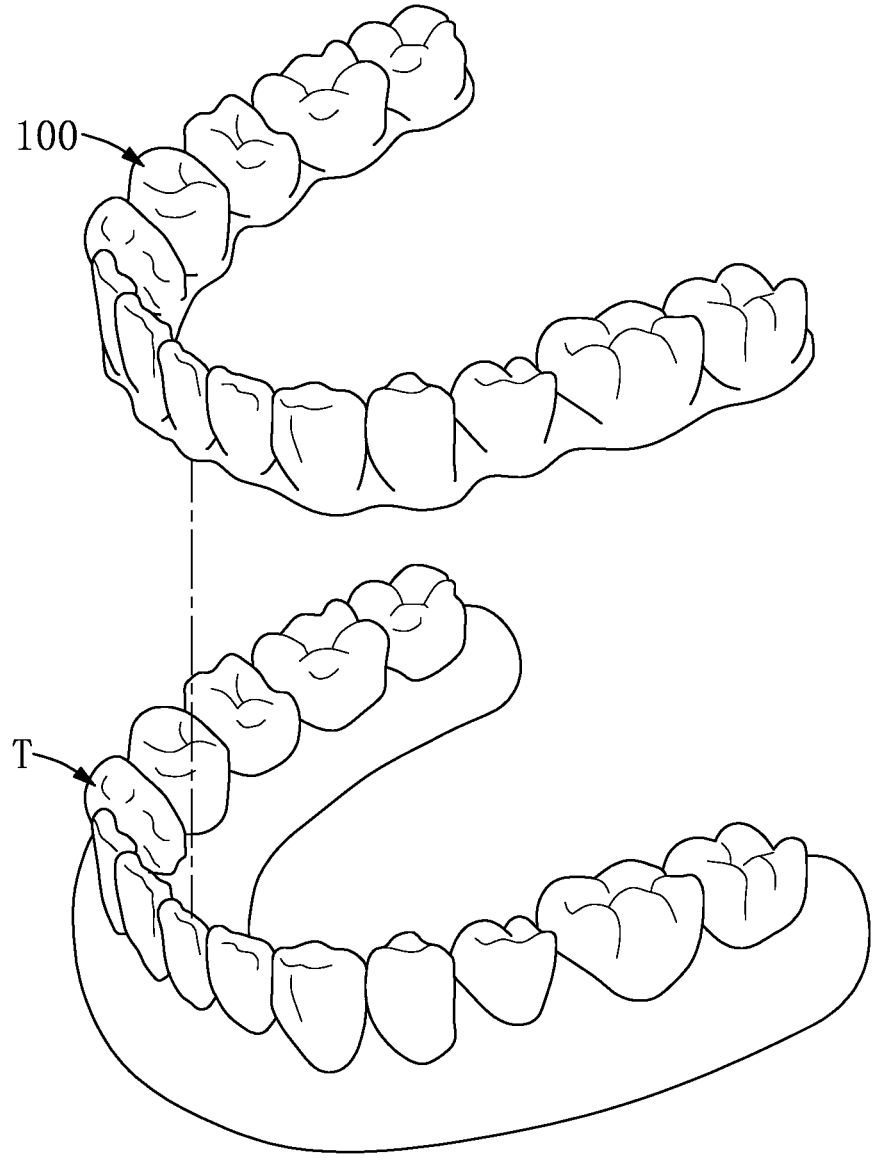
FIG. 2 is a schematic view showing the medicament delivery tooth covering being placed on a dentition of a user according to the first embodiment of the present disclosure.
Figure 3:
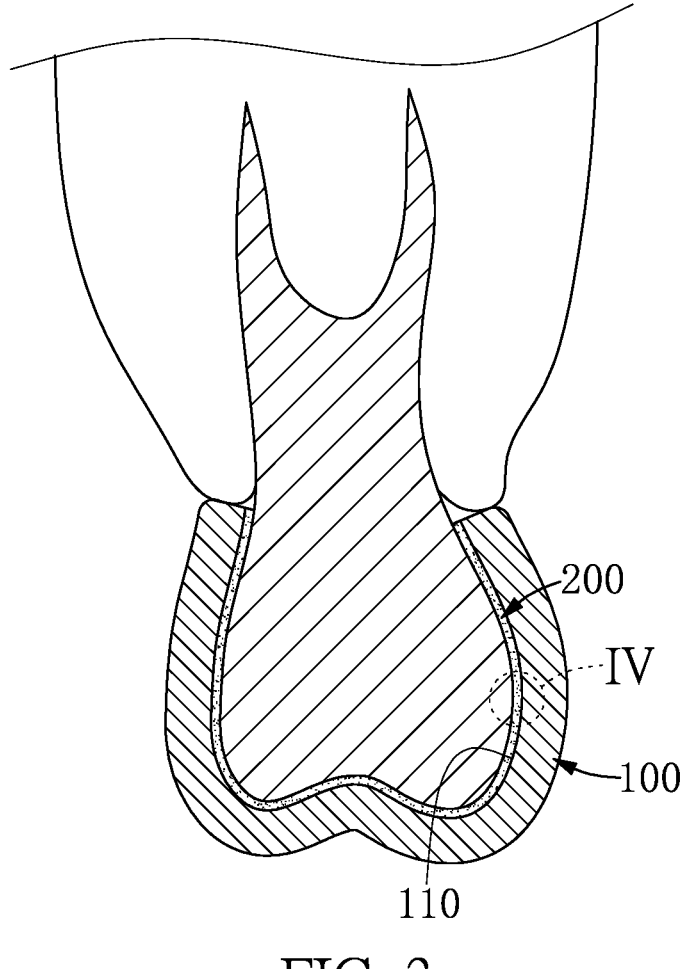
FIG. 3 is a schematic sectional view of the medicament delivery tooth covering being placed on a tooth of the user according to the present disclosure.

Referring to FIG. 1 to FIG. 3, a first embodiment of the present disclosure provides a medicament delivery tooth covering, which includes a tooth covering 100 and a carrier layer 200 that carries a medicament 300.

As shown in FIG. 1 and FIG. 2, receiving spaces that correspond to a plurality of teeth T of a dentition of a user are formed at an inner side of the tooth covering 100, and an inner side surface of the tooth covering 100 has at least one attachment surface 110 that is attached to the teeth T of the user.

More specifically, in the present embodiment, the tooth covering 100 is dental braces, or can be invisible braces with dental care function and the like. During the process of manufacturing the tooth covering 100, a three-dimensional (3D) model of the dentition of the user can be generated by 3D scanning. Then, through 3D printing or processing of a numerical control machine tool, the 3D model of the dentition is used to manufacture the tooth covering 100. Alternatively, said 3D model is used to produce a reproduction mold, and then the reproduction mold is used to manufacture the tooth covering 100. However, the present disclosure is not limited thereto. For example, the tooth covering 100 can also be a reproduction of a dental impression. Furthermore, in the present embodiment, the tooth covering 100 is adapted to simultaneously cover a plurality of teeth. However, in practical use, the tooth covering 100 can also be a dental cap or an artificial crown that individually covers a single tooth. In the present disclosure, the shape and form of the tooth covering is not particularly restricted so long as it is a structure (e.g., a tooth strip, a dental tray, and a tooth support) that is adapted to come in contact with teeth.

Figure 4:
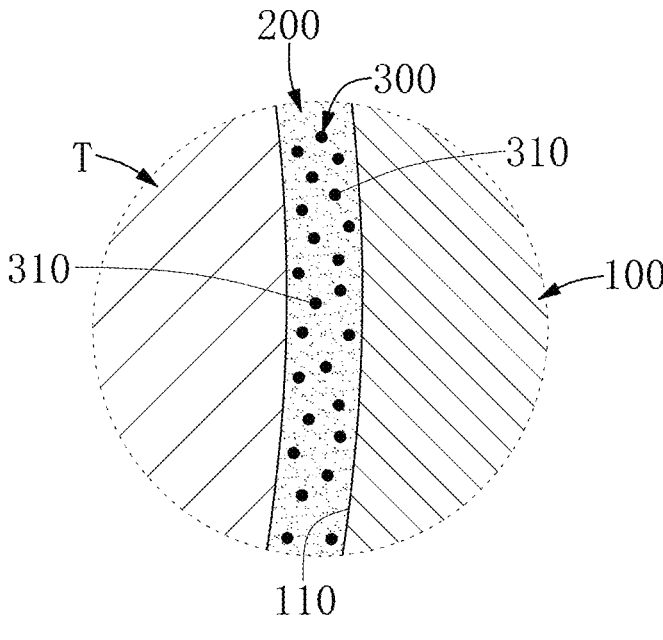
FIG. 4 is an enlarged partial sectional view of part IV of FIG. 3 illustrating a structure of a carrier layer according to the present disclosure.

The carrier layer 200 is arranged on the attachment surface 110 of the tooth covering 100, so that the carrier layer 200 can be attached to at least one side surface of the teeth T of the user when the tooth covering 100 covers the dentition of the user. The carrier layer 200 is mainly used to carry the medicament 300. In addition, when the tooth covering 100 is placed on the dentition of the user and water (e.g., saliva in the oral cavity of the user) is introduced to an inner side of the attachment surface 110, the water is allowed to pass through the carrier layer 200, so that the medicament 300 contacts the water and medicinal components contained in the medicament 300 is released into the water. Accordingly, the medicinal components contained in the medicament 300 can be delivered to the teeth T or the oral cavity of the user. Different configurations of the carrier layer 200 are provided in the present embodiment. For example, referring to FIG. 4, the carrier layer 200 is formed by a gel layer of a polymer base material (e.g., hydrogel). The polymer base material that forms the carrier layer 200 is mixed with the medicament 300, and is then arranged on the attachment surface 110 of the tooth covering 100 by way of coating.

Figure 5:
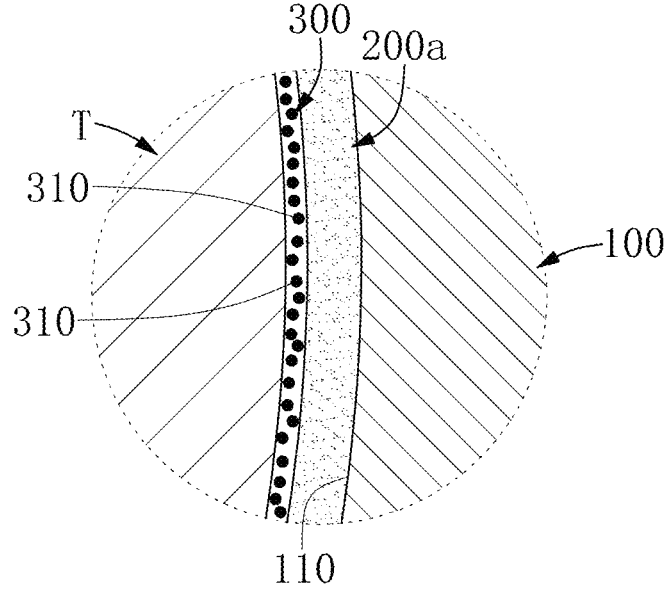
FIG. 5 to FIG. 7 are each an enlarged partial sectional view of different configurations of the carrier layer according to the present disclosure.

Another configuration of the carrier layer 200a is shown in FIG. 5, in which the carrier layer 200a is an elastic gel layer. The medicament 300 is arranged on a surface of the elastic gel layer by way of impregnation, spraying or coating.

Figure 6:
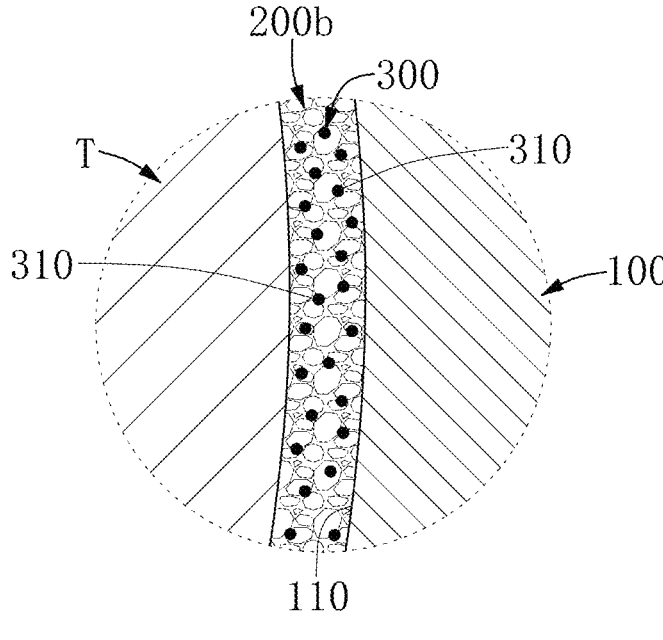

Yet another configuration of the carrier layer 200b is shown in FIG. 6, in which the carrier layer 200b is a sintered material layer that is formed by sintering a particle material, and the particle material has the medicament 300 mixed therein.

Figure 7:
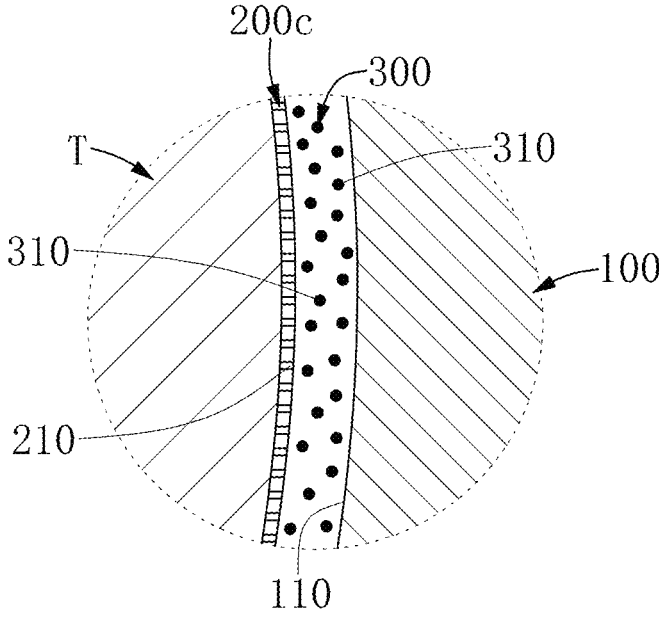

Still yet another configuration of the carrier layer 200c is shown in FIG. 7, in which the carrier layer 200c is a porous water-permeable film, and the medicament 300 is contained in a gap between the carrier layer 200c and the attachment surface 110 of the tooth covering 100. More specifically, in this configuration, the carrier layer 200c can be a gel film or a non-woven fabric layer. Further, the carrier layer 200c has tiny pores 210 such that the water can penetrate through the carrier layer 200c, thereby allowing the medicament 300 to contact the water.

The medicament 300 can be one selected from a tooth remineralizing agent, a tooth desensitizing agent, and a tooth whitening agent. The medicament 300 contains powder particles 310. After contacting the water, the powder particles 310 are capable of releasing components that provide dental care effects.

Figure 8:
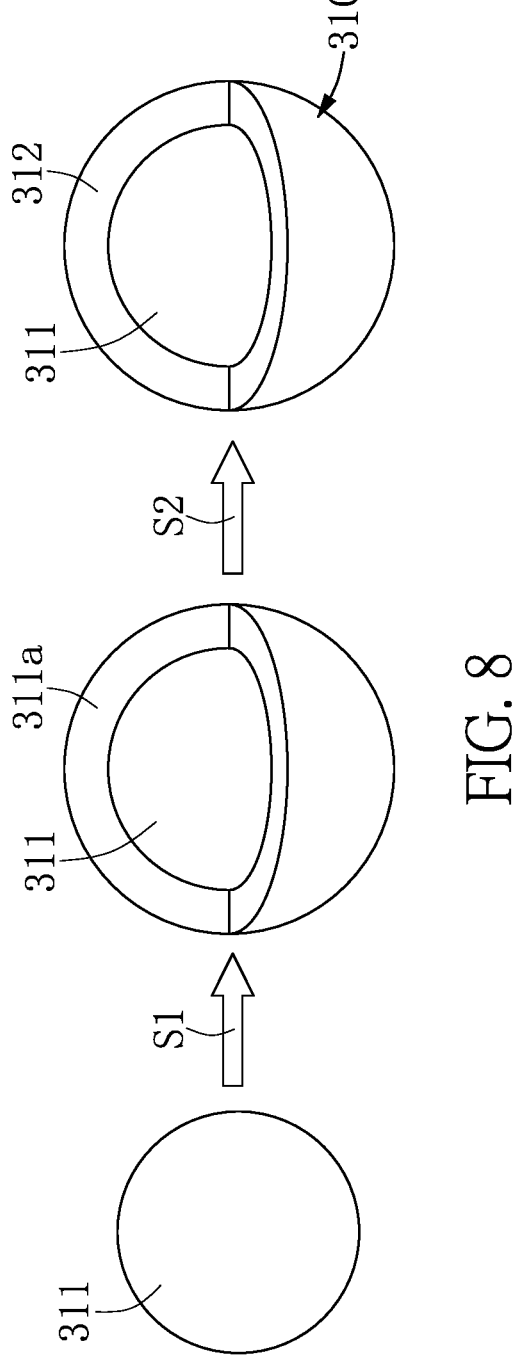
FIG. 8 is a schematic view showing a dual-structured powder particle being formed through a two-stage sintering process according to the present disclosure.
Figure 9A:
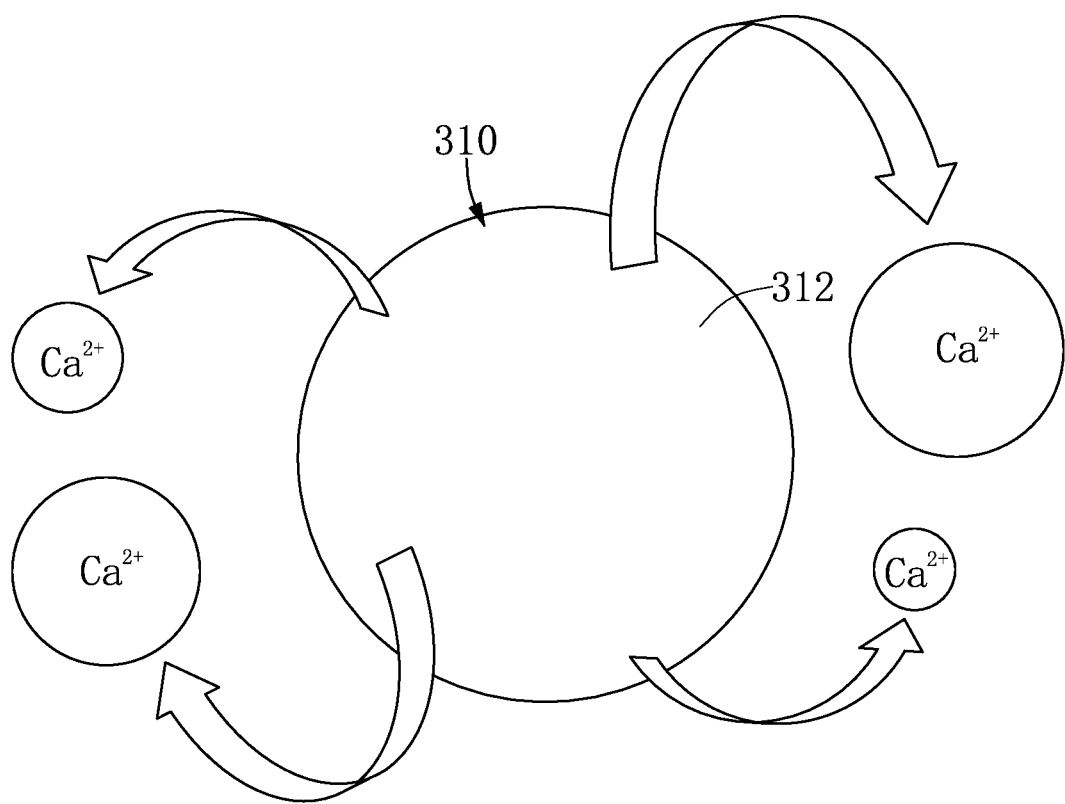
FIG. 9A is a schematic view of the powder particle releasing calcium ions at a first stage according to the present disclosure.
Figure 9B:
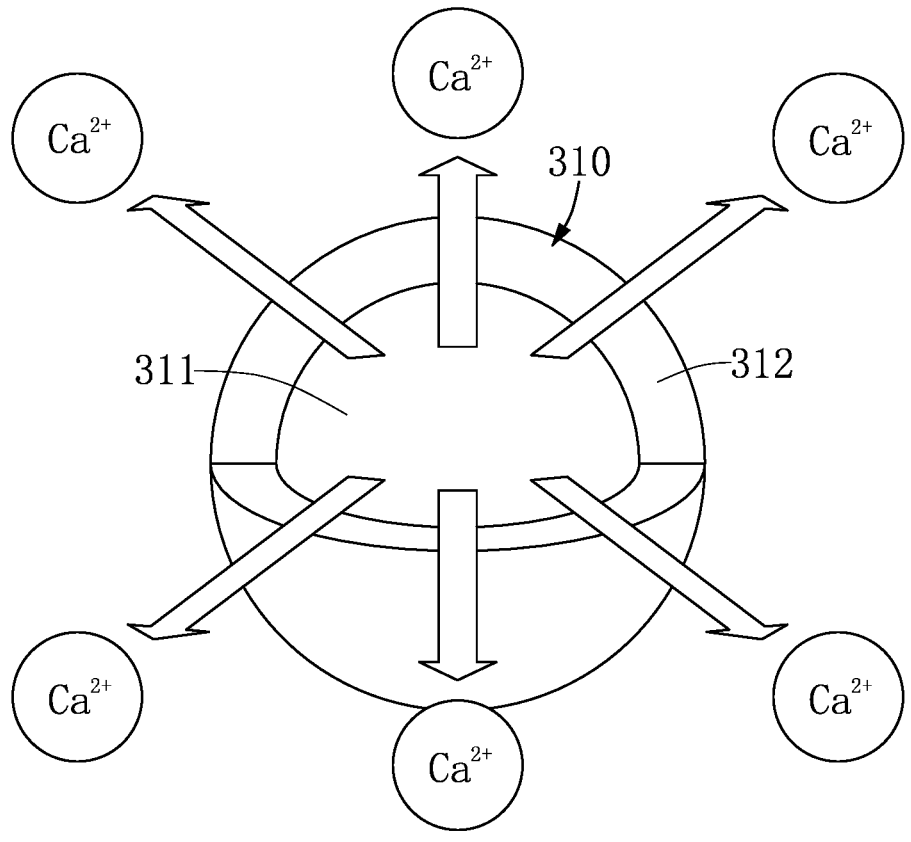
FIG. 9B is a schematic view of the powder particle releasing the calcium ions at a second stage according to the present disclosure.

In the present embodiment, the powder particles 310 contained in the medicament 300 are dual-structured tricalcium phosphate powder particles. As shown in FIG. 8, FIG. 9A, and FIG. 9B, any one of the powder particles 310 has a core structure 311 and an outer layer structure 312. The core structure 311 is an amorphous calcium phosphate (ACP) core, and the outer layer structure 312 is a β-tricalcium phosphate (β-TCP) shell.

As shown in FIG. 9A and FIG. 9B, when the powder particles 310 of the present disclosure contact the water, calcium ions can be released. In this way, the structure of dentinal tubules of the teeth T can be filled, or enamel of the teeth T can be restored, thereby achieving effects of tooth remineralization, tooth desensitization, and tooth whitening. For the powder particles 310 of the present disclosure, the calcium ions are released in two stages. Referring to FIG. 9A, in a water solution, free calcium ions are first released from the outer layer structure 312 of the powder particles 310 that contains β-tricalcium phosphate (β-TCP). When the outer layer structure 312 that contains β-tricalcium phosphate (β-TCP) finishes releasing the free calcium ions, the core structure 311 that contains amorphous calcium phosphate (ACP) is exposed and further releases the free calcium ions. Accordingly, an improved release rate of the calcium ions is obtained, and a concentration of the free calcium ions in the water solution is increased.

Since β-tricalcium phosphate has a better stability, a dissociation speed thereof in water is lower than that of common calcium phosphate powders and amorphous calcium phosphate (ACP). Therefore, the powder particles 310 of the present disclosure are capable of releasing the calcium ions for a long period of time.

As shown in FIG. 8, the powder particles 310 of the present disclosure are configured to form dual-structured calcium phosphate powder particles that have the outer layer structure 312 and the core structure 311 by calcination of an amorphous calcium phosphate (ACP) material through a two-stage sintering process. More specifically, as shown in FIG. 8, amorphous calcium phosphate (ACP) is used as a raw material in the powder particles 310 of the present disclosure, and a shell 311a that contains α-tricalcium phosphate (α-TCP) is formed on an outer surface of the core structure 311 that contains amorphous calcium phosphate (ACP) through a first sintering step S1. Then, through a second sintering step S2, the shell 311a that contains α-tricalcium phosphate (α-TCP) is further converted into the outer layer structure 312 that contains β-tricalcium phosphate (β-TCP). Specifically, a temperature is raised to 700° C. to 800° C. at a heating rate of 3° C./min in the first sintering step S1, and is so maintained for one hour. In the second sintering step S2, the temperature is raised to 800° C. to 900° C., and is so maintained for one to two hours.

In an exemplary embodiment of the present disclosure, the medicament 300 further includes an orally acceptable carrier. For example, the orally acceptable carrier can be a substance conventionally used in a composition for oral health care, such as a solvent, an anticalculus agent, a buffer agent, a grinding and polishing substance, a tooth whitening agent, a tooth bleaching agent, alkali metal bicarbonate, a thickener, a humectant, a surfactant, titanium dioxide, a flavoring agent, a sweetening agent, xylitol, a coloring agent, and a combination thereof.

In an exemplary embodiment of the present disclosure, for the medicament 300, the powder particles 310 can also be mixed with a certain amount of tricalcium phosphate powder particles. The tricalcium phosphate powder particles have a high ion release rate. Accordingly, when the tooth covering 100 of the present disclosure is placed in the oral cavity of the user, an initial ion release concentration can be increased.

Figure 10:
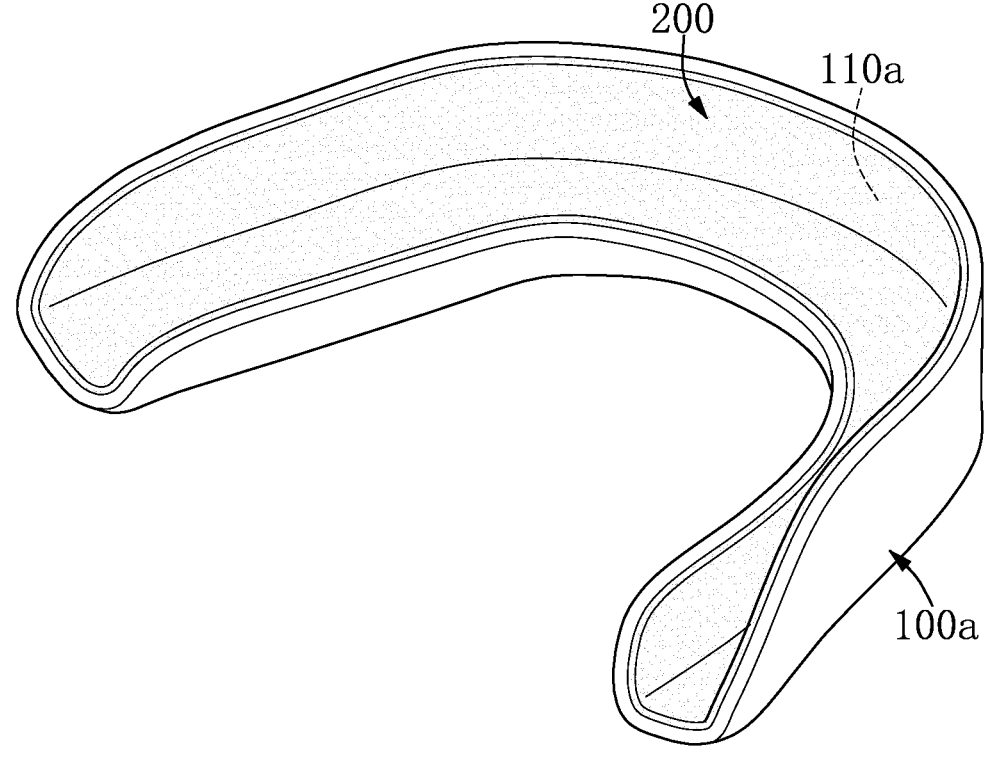
FIG. 10 is a schematic perspective view of the medicament delivery tooth covering according to a second embodiment of the present disclosure.
Figure 11:
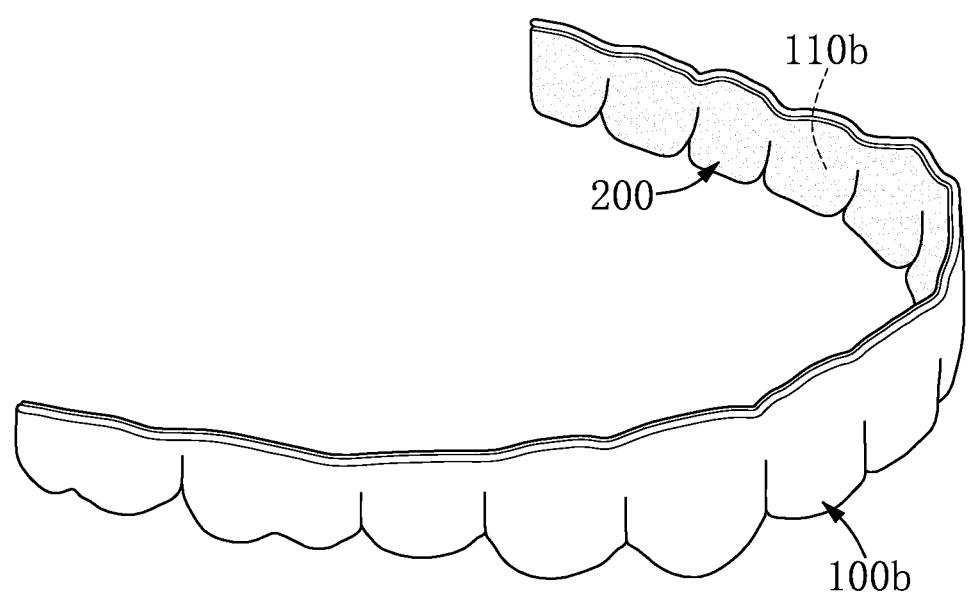
FIG. 11 is a schematic perspective view of the medicament delivery tooth covering according to a third embodiment of the present disclosure.

A second embodiment and a third embodiment of the present disclosure are shown in FIG. 10 and FIG. 11, respectively. It should be noted that main technical features of the second embodiment and the third embodiment of the present disclosure are similar to those of the above-mentioned first embodiment, and will not be reiterated herein.

Referring to FIG. 10, a tooth covering 100a provided in the second embodiment of the present disclosure is a mouth-guard, typically one used in sports. The tooth covering 100a also has an attachment surface 110a, and the carrier layer 200 is arranged on the attachment surface 110a, so as to carry the medicament 300.

Referring to FIG. 11, a tooth covering 100b provided in the third embodiment of the present disclosure is a dental tray or a tooth strip. The tooth covering 100b covers only one side surface of the teeth of the user. Further, the tooth covering 100b also has an attachment surface 110b that faces toward the teeth of the user, and the carrier layer 200 is arranged on the attachment surface 110b, so as to carry the medicament 300.

Beneficial Effects of the Embodiments

In conclusion, one of the beneficial effects of the present disclosure is that, through the carrier layer being arranged on the attachment surface of the tooth covering and the carrier layer carrying the medicament that provides dental care effects, the medicament delivery tooth covering provided by the present disclosure allows the medicament to be directly delivered to the teeth of the user, so as to bring about the dental care effects of remineralization, whitening, enamel restoration, and desensitization.

Another beneficial effect of the present disclosure is that, by virtue of "the β-tricalcium phosphate (β-TCP) shell enclosing the amorphous calcium phosphate (ACP) core", the powder particles contained in the medicament are capable of obtaining an improved release rate of the calcium ions through stability of a calcium phosphate core-shell structure material, and a concentration of the free calcium ions in the water solution can be increased.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method of preparing a medicament delivery tooth covering, comprising:

providing a tooth covering having at least one attachment surface that covers a surface of teeth of a user, wherein the at least one attachment surface is formed into a recessed surface;

applying a carrier layer to the recessed surface; and incorporating into the carrier layer a medicament, wherein the medicament comprises powder particles, and each of the powder particles has an amorphous calcium phosphate (ACP) core and a β-tricalcium phosphate (β-TCP) shell, wherein the method further comprises forming the powder particles, including:

sintering an amorphous calcium phosphate material at a first temperature of 700° C. to 800° C. to convert a portion of the amorphous calcium phosphate material into an α-tricalcium phosphate (α-TCP) outer layer on the ACP core; and sintering the α-TCP outer layer at a second temperature of 800° C. to 900° C. for 1 to 2 hours to convert the α-TCP outer layer into the β-TCP shell.

2. The method according to claim 1, wherein the medicament is one selected from a tooth remineralizing agent, a tooth desensitizing agent, and a tooth whitening agent.

3. The method according to claim 1, wherein the medicament further includes a carrier.

4. The method according to claim 1, wherein the tooth covering is one selected from dental braces, a mouthguard, a dental tray, or a tooth whitening strip.

\* \* \* \* \*